United States Patent
Nilsen

[15] 3,647,414
[45] Mar. 7, 1972

[54] EXTRACTION OF IRON FROM TITANIFEROUS ORES

[72] Inventor: Arnold E. Nilsen, Freehold, N.J.
[73] Assignee: N L Industries, Inc., New York, N.Y.
[22] Filed: July 31, 1969
[21] Appl. No.: 846,343

[52] U.S. Cl............................................75/1, 75/101, 75/104
[51] Int. Cl......................................C22b 3/00, C22b 53/00
[58] Field of Search....................75/101, 104, 112, 1; 23/202

[56] References Cited

UNITED STATES PATENTS

| | | | |
|---|---|---|---|
| 513,490 | 1/1894 | Emmens | 75/104 X |
| 981,451 | 1/1911 | McKechnie | 75/101 |
| 1,021,768 | 4/1912 | Gahl | 75/104 |
| 1,032,400 | 7/1912 | Gunther | 75/101 |
| 1,084,600 | 1/1914 | Best | 75/101 X |
| 2,804,375 | 8/1957 | Kamlet | 23/202 |
| 2,829,964 | 4/1958 | Zimmerley et al. | 75/104 |
| 3,146,091 | 8/1964 | Green | 75/104 X |
| 3,169,853 | 2/1965 | Van Es | 75/104 X |
| 3,293,027 | 12/1966 | Mackiw et al. | 75/101 X |
| 3,457,037 | 7/1969 | Armendia et al. | 23/202 |

FOREIGN PATENTS OR APPLICATIONS

| | | | |
|---|---|---|---|
| 767,560 | 9/1967 | Canada | 75/104 |
| 163,986 | 7/1955 | Australia | 75/2 |

*Primary Examiner*—Allen B. Curtis
*Attorney*—Charles F. Kaegebehn, Robert L. Lehman and Harold L. Gammons

[57] ABSTRACT

The present invention relates to the removal of iron values from titaniferous ores so as to produce a titanium concentrate suitable for chlorination and is characterized by leaching the iron values from a metallized titaniferous ore in two stages using, in combination, a dilute solution of a mineral acid and preferably waste sulfuric acid in the first stage and an oxidizing leach solution in the second stage.

11 Claims, 2 Drawing Figures

PATENTED MAR 7 1972
3,647,414
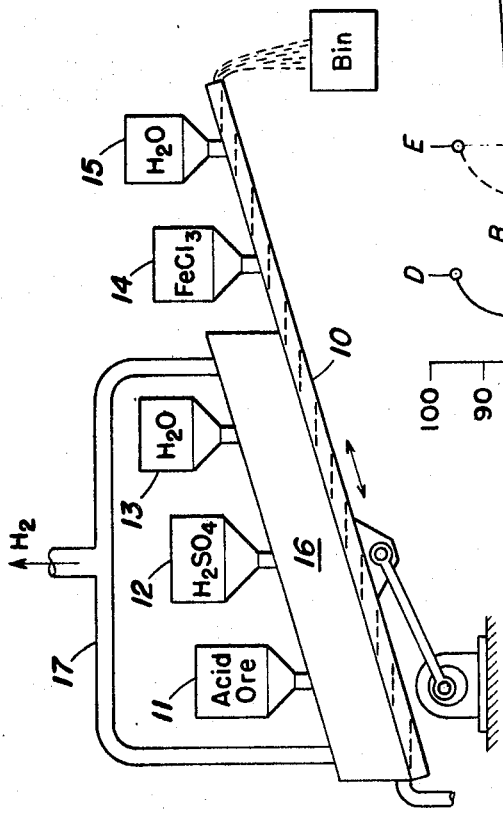
Fig. 2.
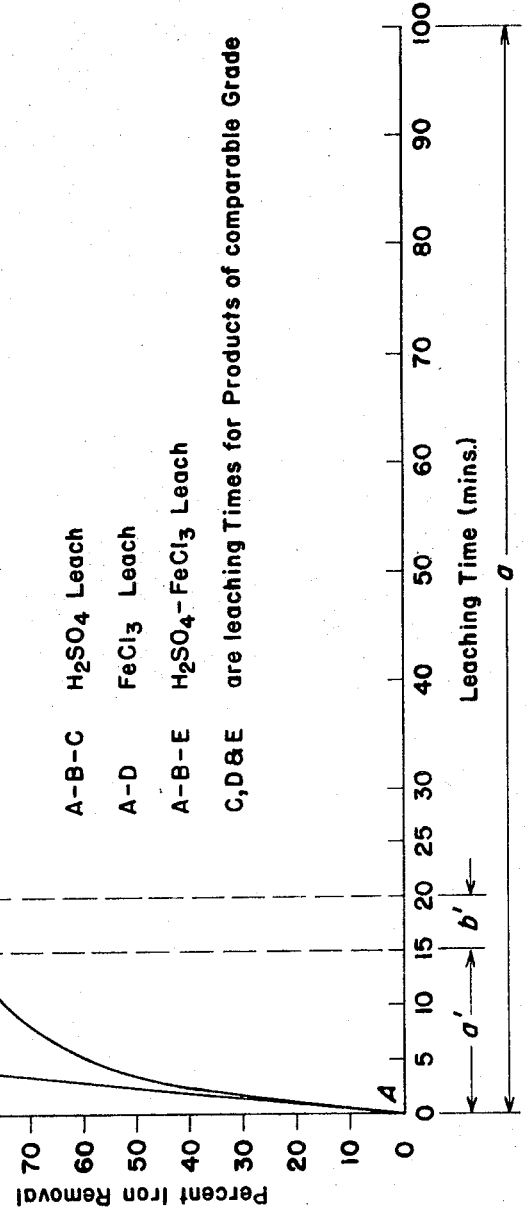
Fig. I.
A-B-C   $H_2SO_4$ Leach
A-D     $FeCl_3$ Leach
A-B-E   $H_2SO_4-FeCl_3$ Leach
C,D & E are leaching Times for Products of comparable Grade
INVENTOR.
Arnold E. Nilsen
BY
H.L. Gammons
AGENT

EXTRACTION OF IRON FROM TITANIFEROUS ORES

BACKGROUND OF THE INVENTION

The removal of iron from various iron-bearing titaniferous materials is frequently referred to in the art as ore beneficiation and is done for the purpose of obtaining a substantially iron-free $TiO_2$ concentrate which, without further treatment, may be used as pigmentary material for certain purposes, or which may be chlorinated to produce titanium tetrachloride useful in the production of titanium dioxide pigments and the like.

Several techniques for beneficiating titaniferous ores are known in the art. U.S. Pat. No. 2,406,577 Aug. 27, 1946 discloses two-stage treatment of titaniferous ores with hydrochloric acid—the chloride ion concentration of which is increased by the addition of soluble chloride salts the beneficial effect of the chloride salt addition being observed primarily in the first stage where fresh ore is treated with partially spent hydrochloric acid.

U.S. Pat. No. 3,193,376, July 6, 1955 discloses a process for beneficiating ilmenite in a two-stage leaching process using a mixture of partially spent HCl plus fresh HCl in the first stage and fresh HCl only in the second stage both leaching stages being carried out under pressure from 30 to 35 p.s.i.g. and at a temperature from 105° C. to 110° C.

U.S. Pat. No. 2,912,320, Nov. 10, 1959 teaches leaching a titaniferous ore with nitric acid, and U.S. Pat. No. 2,961,298, Nov. 22, 1960 describes a process for selectively leaching iron from a titaniferous ore by first roasting the coarsely pulverized ore in air and then leaching the roasted ore under reducing conditions with dilute sulfuric acid in the presence of a grinding medium, i.e., porcelain balls, which are alleged to rub the ore particles and hence expose fresh surfaces to attack by the acid.

U.S. Pat. No. 3,252,787, May 24, 1966 discloses beneficiating a titaniferous ore by preroasting the ore followed by reduction using a solid or gaseous reducing agent to convert the iron values to metallic iron which is dissolved out of the ore with a 12 percent ferric chloride solution. The resulting ferrous chloride is then reacted with oxygen to effect complete recovery of the ferric chloride.

While each of the processes mentioned above has had some limited application each has suffered from one or more disadvantages the most prevalent of which is cost both in terms of materials used and the time required to effect optimum iron removal.

With the constantly growing demand for titanium products such as pigmentary titanium dioxide, titanium tetrachloride and titanium metal there is dire need for a process of upgrading titaniferous ores economically and quickly.

SUMMARY OF THE INVENTION

The present invention is the discovery of a new and novel leaching process for beneficiating titaniferous ores quickly and economically, and comprises a new combination of leaching steps or stages characterized by using a dilute mineral acid such as dilute sulfuric acid or dilute hydrochloric acid and preferably waste sulfuric acid for a predetermined length of time in the first stage and thereafter subjecting the partially leached ore to an oxidizing leach either as a separate step or admixed with the waste acid of the first leach, and also for a predetermined length of time.

As shown by the prior art, dilute sulfuric acid has been used previously as a leaching agent and while it has the advantage of being relatively inexpensive and acting quickly initially to dissolve a major portion of the metallic iron from a metallized titaniferous ore, the remainder of the extractable iron in the ore can be dissolved only by extending the leach period for prohibitively long periods of time. Ferric chloride has also been used as a leaching agent and while ferric chloride effects almost complete removal of the metallic iron from a metallized titaniferous ore in a short period of time, ferric chloride is far more expensive than dilute sulfuric acid and hence it is necessary for all practical purposes to regenerate ferric chloride from a leach liquor for reuse. This is usually done by reacting the ferrous chloride leach liquor with oxygen. However the iron hydroxide which is formed during regeneration presents a difficult problem of removal and this problem coupled with the prevailing cost of oxygen and the time required to regenerate the ferric chloride renders its use as a leaching agent commercially unfeasible.

DESCRIPTION OF THE DRAWINGS

FIG. 1. of the drawings shows graphically by curves A–B–C and A–D the leaching cycles of dilute sulfuric acid and ferric chloride, respectively; and by curve A–B–E the combined leaching cycles of waste acid and an oxidizing leach i.e., ferric salt according to the two-stage method of this invention.

FIG. 2. is a schematic view of one form of apparatus for carrying out the two-stage leaching method of this invention.

DESCRIPTION OF PREFERRED EMBODIMENT

The present invention relates to a two-stage leaching process. More particularly the two-stage leaching process of this invention is characterized by the use successively of a dilute solution of sulfuric acid and in particular "waste acid," and and oxidizing leach solution which may comprise an aqueous solution of a ferric salt such as ferric chloride, or ferric sulfate, each leach solution being used under conditions which are closely controlled for effecting the most efficient use of each leach solution, that is to say the shortest leaching times and the most complete removal of iron values.

The invention is applicable to leaching the iron values from any of the commonly known kinds of titaniferous materials and in particular ilmenite ores of the beach sand type such as Quilon and Florida beach sands; and the massive ores such as MacIntyre ore which originate from the ore deposits at Tahawus, N.Y. The beach sands, as mined, will usually have a particle size in the range of from 28 to 200 mesh, by Tyler screen measurement, and hence may be leached without preliminary grinding while the massive ores must first be ground to the required particle size range. Moreover it may be desirable, in some instances, to upgrade the ores by the removal of gangue and particularly nonmagnetic gangue materials before being processed for the removal of the iron values, typical upgrading techniques including crushing, grinding, screening, followed by magnetic separation of the gangue constituents. In the interest of brevity the term "ore" as used herein and in the appended claims will be understood to include ores upgraded by the usual mineral dressing techniques.

Before leaching the ore it is first reduced to convert the iron values to metallic iron. This may be done by heating the upgraded ore to a temperature in the range from 700°–1,250° C. and in the presence of a gaseous or solid reducing agent for from one-half hour to 6 hours depending upon the nature of the ore, the reduction technique used, i.e., static or fluidized bed, the kind of reductant used, and related factors. While the iron values in the beach-sand-type ores are amenable to reduction to metallic iron without previous oxidation, the iron values in the massive ores are predominately in the ferrous state and hence it is usually necessary to roast these ores in the presence of air or other oxygen-containing gas to convert the ferrous iron to ferric iron prior to reduction. Reduction may be carried out in a static bed reduction furnace but is preferably done in a rotary kiln, or a fluidized bed type process to insure substantially complete reduction of the iron values to metallic iron.

Following reduction the ore may be leached directly using the improved leaching method of this invention; or the reduced ore may first be magnetically separated to remove any residual solid reductant and gangue materials and thereafter lightly ground, if necessary, to render the metallic iron in the ore more accessible for leaching.

According to the improved method of this invention the reduced ore is leached in two stages. The leaching agent used in the first stage is dilute sulfuric acid of from about 3-24% $H_2SO_4$. For economic reasons however it is preferred to use the residual sulfuric acid obtained in the process for producing $TiO_2$ by hydrolyzing a titanium sulfate solution, this residual acid being referred to in the art as "waste acid." A typical waste acid will comprise from 5-24% $H_2SO_4$. Pursuant to the discovery of the present invention the amount of waste acid used is relatively small and experience has shown that an amount corresponding to a $H_2SO_4$ to total iron ratio in the range of about 1:1 to 3:1 is satisfactory for both the beach sand and massive type ores. Leaching the reduced ore with the waste acid may be done in any manner that involves sufficient agitation to effect high surface contact, i.e., by spraying or sprinkling the waste acid on a moving bed of ore, or by slurrying the ore with the acid; and in accordance with the concept of this invention is carried out at a temperature in the of from $25°–100b° C$. and preferably in the range of from $60°–70° C$. and for a period of time corresponding to that during which maximum rate of dissolution of the metallic iron takes place. It has been found that when leaching a reduced ilmenite with waste acid this maximum dissolution leaching time, which is indicated at $a'$ in FIG. 1 of the drawing is in the range of from 5-15 minutes and is but a faction of the total time, represented at $a$, required for removal of from 90 to 95 percent of the iron.

Since hydrogen gas will be generated during waste acid leaching some precautionary measures should be taken to collect the $H_2$ and/or exhaust it in some safe manner.

The second stage leach may be carried out in either of two ways. Using the first procedure the partially leached ore produced by the first stage leach is separated by filtration from the waste acid, washed with water for from 1 to 5 minutes at a temperature of 20°-50of from C. to remove any residual waste acid and thereafter leached with an oxidizing leach solution comprising an aqueous solution of a ferric salt such as ferric chloride or ferric sulfate; or alternatively the second stage leach may be effected by adding a ferric salt directly to the first leach solution or sparging air or oxygen into the latter to form ferric ions in situ, and continuing the leaching action. The latter procedure is preferred over the former but irrespective of which of the two procedures is followed the required amount of ferric ions in solution is relatively small. Thus experience has shown that when ferric chloride is used an amount corresponding to a ratio of ferric chloride to total iron of from about 0.50 to 0.75:1 is satisfactory; and where ferric sulfate is substituted for ferric chloride this ratio may be as low as about 0.25:1. Also when air is sparged into the first leach solution it should be added at the rate of from about 12 to about 18 s.c.f.m./100 grams ore; and when oxygen is used at the rate of from about 5 to about 8 s.c.f.m./100 grams of ore.

In addition to sparging air or oxygen into the acid leach solution other inexpensive sources of ferric ions (for oxidizing the metallic iron to water soluble ferrous iron) include hematite ($Fe_2O_3$), pyrolusite or copper as (ferrous sulfate) plus air which may be added to the acid leach following the first stage leach. Moreover irrespective of whether the ferric ions are added as such or formed in situ, following the waste acid leach, experience has shown that the rate of leaching will be increased by the addition of small amounts of an accelerator, typical accelerators being ammonium chloride and gaseous $SO_2$. The latter is especially attractive economically where it is available as a waste product recovered from calciner off-gases or acid-plant stack gases produced in the process of manufacturing sulfate-base $TiO_2$ pigments.

The second stage leach is carried out at a pH from 3-5, at a temperature in the range from 25° to 100° C. and preferably in the range of from 70°-90° C. and for a length of time which again corresponds to that period of time during which maximum rate of iron dissolution takes place. In reducing the present invention to practice it was found that this leaching time, as represented at $b'$ in the drawing is in the range from 5-15 minutes which is but a fraction of the total time required to remove from 90 to 95 percent of the iron by the use of ferric chloride alone (including the time required for regeneration of the ferric chloride). Following the second leach the leached ore is separated from the leach liquor by filtration, washed with water at from 15° to 50° C. and thereafter dried.

Thus using the novel combination of leaching steps of this invention the one is first leached with waste acid for the period of time represented at $a'$ after which leaching is continued with an oxidizing leach solution, i.e., solution containing ferric ions for the period of time represented at $b'$. The former period of time may be as short as 5 minutes to about 15 minutes while the latter period may be as short as 5 minutes to about 8 minutes the total leaching time for the two stages being from 10 to 23 minutes during which from 90–95 percent of the iron is removed from the reduced ore. The respective leaching periods stated above are the preferred ranges for achieving maximum iron removal at highest economies but it will be understood that the leaching times may be extended and high percentages of iron removal have been obtained with an acid leach of 30 minutes followed by an oxidizing leach of 15 minutes albeit at some sacrifice in economy.

The foregoing results are in marked contrast to the results achieved by methods of the prior art. Thus as illustrated in the drawing and shown by the examples below leaching with sulfuric acid alone, as represented at $a$, has required leaching periods of from 100 minutes to 2½ hours to attain 90–95 percent iron removal and while the actual leaching time for ferric chloride alone is much shorter, i.e., about 8–10 minutes nevertheless relatively large amounts of ferrous chloride are formed during the leach which for economic reasons must be reoxidized to ferric chloride for reuse which in itself, is both time-consuming and costly.

As pointed out above the ore may be leached by spraying or sprinkling a leaching agent on a bed of ore agitated by vibration or raking means, by slurrying the ore and leaching agent, or by any other means that will insure high surface contact. Apparatus found to be suitable for the purpose is shown schematically in FIG. 2 and comprises an inclined vibrating trough 10 provided with a plurality of receptacles 11,12,13,14 and 15 mounted successively above it, for spraying the two leaching agents, i.e., dilute solution of sulfuric acid and an aqueous solution of a ferric salt, respectively, and the wash water onto the ore as it is carried upwardly in the trough by the vibrating motion thereof. Since some $H_2$ is generated during the sulfuric acid leach it is expedient to enclose the lower end of the trough with a gastight hood 16 equipped with discharge duct 17. It will be understood however that the invention is not limited to any particular leaching apparatus and that any of several types of conventional equipment can be used.

In order to illustrate the invention more fully the examples are given.

EXAMPLE I

A sample of Florida ilmenite ore comprising about 21.2 percent iron and 63.1 percent titanium dioxide and having a particle size in the range of from 25 to 200 mesh by Tyler screen measurement was reduced by heating at a temperature of 1,100° C. for 5 hours in the presence of anthracite coal as reducing agent. Fifty grams of the reduced ore analyzing about 72% $TiO_2$ and 24 percent Fe(T) were then leached for 12 minutes by slurrying the reduced ore in 368 ml. of dilute sulfuric acid, (10% $H_2SO_4$) at 60°–70° C. the ratio of acid to total iron being about 3:1. Thereafter and without removing the waste acid from the partially leached ore 39 ml. of an aqueous solution of ferric chloride comprising 233 gpl. $FeCl_3$ were added to the ore slurry. Leaching was continued at a temperature of 60° –70° C. for 8 minutes the ratio of $FeCl_3$ to the total iron being about 0.75:1. Following the ferric chloride leach the leached ore was recovered by filtration, washed with water at 20° C. for 5 minutes and then dried. The leached ore analyzed 93.1% $TiO_2$ and 1.9% Fe which denoted removal of 93.7 percent of the iron in a total of 20 minutes. Substantially no $TiO_2$ was lost during leaching.

EXAMPLE II

The process of Example I was repeated substantially in all details except that a waste acid of 22% $H_2SO_4$ acid strength was used in the first stage leach.

The leached ore assayed 93.5% $TiO_2$ and 1.8% Fe. Iron removal in this case was 94.0 percent and the total leaching time was only 13 minutes.

EXAMPLE III

The process of Example I was again repeated except that in this instance the ferric salt solution was ferric sulfate used in an amount corresponding to a ratio of ferric sulfate to total iron of about 0.75:1. In this case the leached ore assayed 93.4% $TiO_2$ and 1.7% Fe. Iron removal was 95.0 percent and the total leach time was only 20 minutes.

EXAMPLES IV AND V

Additional leaching experiments were made according to Example I but using in the one case a Quilon beach sand and in the other a MacIntyre concentrate, respectively. Leaching was done with the same leaching agents of varying concentrations details of which are set out in the Table below. In each of these experiments the iron removal was at least 90.0 percent to as high as 95.0 percent and the total leaching time was no more than 20 minutes with no loss of $TiO_2$.

EXAMPLES VI AND VII

Two additional experiments were run similar in all respects to Examples IV and II respectively except that in these experiments the acid-ore slurry produced by the first leach was filtered and the partially leached ore washed for 5 minutes to remove any residual acid after which the washed ore was leached with the ferric salt. The total leaching time was 20 minutes for each of Examples VI and VII. The total iron removal was 94.0 percent for the Quilon and 93.9 percent for the Florida ore.

EXAMPLES VIII, IX AND X

In the preceding experiments the ratio of ferric salt to total iron was about 0.75:1. Several additional experiments were made to demonstrate that the amount of ferric salts required could be decreased without a substantial loss of product grade. Thus in Example VIII the ore of Example I was leached with 22% $H_2SO_4$ at a ratio of acid to total iron of 3:1 and at 60°-80 C. for about 8 minutes and thereafter leached with $FeCl_3$ for about 5 minutes, the ratio of $FeCl_3$ to reduced ore being 0.5:1. Iron removal was 93.8 percent. Example IX was run as a repeat to Example III except that the ratio of $Fe_2(SO_4)_3$ to iron in the second leach was 0.5:1. As shown in the Table below the decrease in amount of ferric salt did not effect iron removal adversely. Example X was run using the procedure of Example IX but the ratio of ferric sulfate to iron was lowered further to 0.25:1. The amount of iron removed was somewhat less than in the preceding examples but still highly satisfactory.

EXAMPLE XI

As mentioned above the second stage leach may be effected by the addition of ferric ions to the first leach solution or alternatively by forming ferric ions in situ in the first leach solution. Using the latter procedure 40 grams of metallized Florida ilmenite containing 71.5% $TiO_2$ and 24.0% Fe were leached in 158 ml. of 10 percent waste $H_2SO_4$ at a pH of less than 1 and an acid to ore ratio of 0.49 for 1 hour at 70°-80° C. During the second half hour of leaching oxygen was sparged into the solution at the rate of 2.4 standard cu. ft./hr. After filtering, washing and drying the leached ore contained only 2.7 percent total iron.

EXAMPLE XII

The procedure of Example XI was repeated except that acid leaching was carried out for 1½ hours and air instead of oxygen was introduced during the last hour of leaching by sparging the air into the leach solution at the rate of 6 standard cu. ft./hr. (2.81 /min.). After filtering the leached ore was found to contain only about 2.6 percent total Fe.

EXAMPLE XIII

Another experiment was run in which 40 grams of metallized Florida ilmenite containing 71.5% $TiO_2$ and 24.0% Fe was leached in 187.5 ml. of 10 percent waste sulfuric acid at an acid to ore ratio of 0.49 for about a half hour at 70°-80° C. Thereafter 0.25 percent nitric acid was added and leaching was continued for another 0.5 hours. After filtering, washing and drying the leached ore contained only 2.8 percent total iron.

EXAMPLE XIV

In order to illustrate the accelerating effect of gaseous $SO_2$ another experiment was run according to the preceding examples wherein reduced Florida ilmenite ore was leached for 30 minutes with 8.3 percent waste sulfuric acid at an acid to ore ratio of 1.0 and at 60°-70° C. Thereafter air plus gaseous $SO_2$ were sparged into the leach solution for an additional 15 minutes the $SO_2$:ore ratio being 0.04 and the air:ore ratio being 1.5 by weight.

The leached ore analyzed 2.7 percent total iron and 92.4% $TiO_2$ and compared favorably with the ore leached with the use of oxygen (Example XI) and the ore leached with air (Example XII) the leaching time with air plus $SO_2$ being only half that for air alone.

EXAMPLE XV

In order to illustrate the advantages of the two-stage leach of this invention over the practices of the prior art Experiment I was repeated except that leaching was done in one stage using dilute sulfuric acid (10% $H_2SO_4$) only and a ratio of acid to total iron of about 3:1. Leaching was continued until the iron removal substantially equalled that obtained in Example I. The time required was 100 minutes.

EXAMPLE XVI

An additional experiment was run to illustrate one stage leaching with ferric chloride. In this case Example I was repeated except the Florida ilmenite was leached with a ferric chloride solution comprising 233 g.p.l. $FeCl_3$ until the iron removed was substantially equal to that in Example I the ratio of $FeCl_3$ to total iron being about 5.59:1. Due to the extremely high ratio of $FeCl_3$ to total iron the total leaching time was only 8 minutes. However 260 ml. of ferrous chloride was formed which in commercial practice would necessarily have to be reoxidized by heating in air or oxygen at elevated temperatures and pressures which is extremely time-consuming. Thus although the actual leaching time is relatively short the total time required must, for practical purposes, include the time spent in reoxidizing the ferrous chloride to ferric chloride and hence is prohibitively long.

TABLE.—TWO-STAGE LEACH OF REDUCED ILMENITE ORE

| Example | II | III | IV | V | VI | VII | VIII | IX |
|---|---|---|---|---|---|---|---|---|
| Ore | Florida | Florida | Florida | Florida | Quilon | Florida | Florida | Florida |
| Percent $TiO_2$ | 63.3 | 63.3 | 59.1 | 45.1 | 59.1 | 63.3 | 63.3 | 63.3 |
| Percent FeO | 4.3 | 4.3 | 8.9 | 39.4 | 8.9 | 4.3 | 4.3 | 4.3 |
| Percent $Fe_2O_3$ | 25.4 | 25.4 | 25.2 | 5.1 | | | | |
| Particle size (Tyler mesh) | −35+200 | −35+200 | −28+200 | +14−200 | −28+200 | −35+200 | −35+200 | −35+200 |
| Reductant | Coal | Coal | Coal | Coal | Coal | Coal | Coal | Coal |
| Reduction temp. (° C.) | 1,100 | 1,100 | 1,100 | 1,100 | 1,100 | 1,100 | 1,100 | 1,100 |

TABLE.—TWO-STAGE LEACH OF REDUCED ILMENITE ORE

| Example | II | III | IV | V | VI | VII | VIII | IX |
|---|---|---|---|---|---|---|---|---|
| 1st leach: | | | | | | | | |
| Reagent | 22% $H_2SO_4$ | 10% $H_2SO_4$ | 10% $H_2SO_4$ | 10% $H_2SO_4$ | 10% $H_2SO_4$ | 10% $H_2SO_4$ | 22% $H_2SO_4$ | 22% $H_2SO_4$ |
| Ratio reagent/total iron | 3:1 | 3:1 | 3:1 | 3:1 | 3:1 | 3:1 | 3:1 | 3:1 |
| Temp., °C | 60–70 | 60–70 | 60–70 | 60–70 | 60–70 | 60–70 | 60–70 | 60–70 |
| Time (mins.) | 8 | 15 | 15 | 15 | 15 | 15 | 8 | 8 |
| Washing (mins.) | | | | | 5 | 5 | | |
| 2nd leach: | | | | | | | | |
| Reagent | $FeCl_3$ | $Fe_2(SO_4)_3$ | $FeCl_3$ | $FeCl_3$ | $FeCl_3$ | $FeCl_3$ | $FeCl_3$ | $Fe_2(SO_4)_3$ |
| Ratio reagent/total iron | 0.75:1 | 0.75:1 | 0.75:1 | 0.75:1 | 0.75:1 | 0.75:1 | 0.5:1 | 0.5:1 |
| Temp. (°C.) | 60–70 | 60–70 | 60–70 | 60–70 | 60–70 | 60–70 | 60–70 | 60–70 |
| Time (mins.) | 5 | 5 | 5 | 5 | 5 | 5 | 5 | 5 |
| Total leaching time (mins.) | 13 | 20 | 20 | 20 | 20 | 20 | 13 | 13 |
| Wash (mins.) | 5 | 5 | 5 | 5 | 5 | 5 | 5 | 5 |
| Fe removal (percent) | 94.0 | 95.0 | 95.0 | 90.0 | 94.0 | 93.9 | 93.8 | 95.0 |
| Product: | | | | | | | | |
| $TiO_2$ (percent) | 93.5 | 93.4 | 91.5 | 79.1 | 92.4 | 91.4 | 93.1 | 93.6 |
| Fe (percent) | 1.8 | 1.7 | 2.0 | 6.6 | 1.9 | 2.5 | 2.0 | 1.6 |

| Example | X | XI | XII | XIII | XIV | XV | XVI |
|---|---|---|---|---|---|---|---|
| Ore | Florida | Florida | Florida | Florida | Florida | Florida | Florida |
| Percent $TiO_2$ | 63.3 | 71.5 | 71.5 | 71.5 | 71.5 | 63.3 | 63.3 |
| Percent FeO | 4.3 | | | | | 4.3 | 4.3 |
| Percent $Fe_2O_3$ | | | | | 24.0 | 25.4 | 25.4 |
| Particle size (Tyler mesh) | −35+200 | −35+200 | −35+200 | −35+200 | −35+200 | −35+200 | −35+200 |
| Reductant | Coal | Coal | Coal | Coal | Coal | Coal | Coal |
| Reduction temp., °C | 1,100 | 1,100 | 1,100 | 1,100 | 1,100 | 1,100 | 1,100 |
| 1st leach: | | | | | | | |
| Reagent | 22% $H_2SO_4$ | 10% $H_2SO_4$ | 10% $H_2SO_4$ | 10% $H_2SO_4$ | 8.3% $H_2SO_4$ | 10% $H_2SO_4$ | $FeCl_2$.[a] |
| Ratio reagent/total iron | 3:1 | 0.49 | 0.49 | 0.49 | 1.0 | 3:1 | 5.59:1 |
| Temp., °C | 60–70 | 70–80 | 70–80 | 70–80 | 60–70 | 60–70 | 60–70 |
| Time (mins.) | 8 | 60 | 90 | 30 | 30 | 100 | 8 |
| Washing (mins.) | | | | | | | |
| 2nd leach: | | | | | | | |
| Reagent | $Fe_2(SO_4)_3$ | $O_2$ | Air | Air + $SO_2$ | $HNO_3$ | Air + $SO_2$ | |
| Ratio reagent/total iron | 0.25:1 | 2.4 cu. ft./hr | 6.0 cu. ft./hr | 0.25 g | | Air:ore=1.5; $SO_2$:ore =0.04. | |
| Temp., °C | 60–70 | | | | | | |
| Time (mins.) | 5 | 30 [b] | 60 [b] | 30 | 15 | | |
| Total leaching time (mins.) | 13 | 60 | 90 | 60 | 45 | | |
| Wash (mins.) | 5 | | | | | | |
| Fe removal (percent) | 93.0 | | | | | 94.1 | 94.5 |
| Product: | | | | | | | |
| $TiO_2$ (percent) | 93.0 | | | | 92.4 | 93.3 | 92.5 |
| Fe (percent) | 2.2 | 2.7 | 2.6 | 2.8 | 2.7 | 1.8 | 1.7 |

[a] 232 g.p.l.  [b] During 1st leach.

From the foregoing description and experiments it will be seen that by using the two-stage leaching method of this invention wherein dilute sulfuric acid and an oxidizing leach comprising ferric ions in solution were used as leaching agents for predetermined periods of time definitive of the maximum rates of iron dissolution unexpectedly high removal of iron has been achieved from reduced ilmenite ores in far shorter times and with greater economies than has been possible by the methods of the prior art.

While this invention has been described and illustrated by the examples shown, it is not intended to be strictly limited thereto, and other variations and modifications may be employed within the scope of the following claims.

I claim:

1. Method for leaching the iron from finely divided ilmenite ores to produce a titanium dioxide concentrate comprising the steps of: heating the finely divided ore under reducing conditions to reduce the iron values in said ore to metallic iron, removing gangue material from the metallized ore, leaching the metallized ore with a dilute sulfuric acid for 5 to 30 minutes to convert the metallized iron to water-soluble ferrous sulfate and subsequently leaching the acid leached ore with an oxidizing agent selected from the group consisting of ferric salts and nitric acid, said oxidizing leach being carried out at an acid pH and for 5 to 15 minutes to convert the residual metallized iron in said ore to a water-soluble ferrous salt (sulfate), and recovering the leached ore from the leach (ferrous sulfate) solution by filtration and then washing and drying the leached ore.

2. Method for leaching the iron from finely divided ilmenite ores to produce a titanium dioxide concentrate according to claim 1 wherein the oxidizing agent is ferric sulfate.

3. Method for leaching the iron from finely divided ilmenite ores to produce a titanium dioxide concentrate according to claim 1 wherein the oxidizing agent is ferric chloride.

4. Method for leaching the iron from finely divided ilmenite ores to produce a titanium dioxide concentrate according to claim 1 wherein the oxidizing agent is nitric acid.

5. Method for leaching the iron from finely divided ilmenite ores to produce a titanium dioxide concentrate according to claim 1 wherein said oxidizing leach is effected by introducing air or oxygen into the dilute sulfuric acid leach solution.

6. Method for leaching the iron from ilmenite ores to produce a titanium dioxide concentrate according to claim 5 wherein the oxidizing leach is accelerated by the addition of gaseous $SO_2$.

7. Method for leaching the iron from finely divided ilmenite ores to produce a titanium dioxide concentrate according to claim 1 wherein the partially leached ore produced by said acid leach is filtered and washed prior to said oxidizing leach.

8. Method for leaching iron from finely divided titaniferous ores according to claim 1, wherein leaching with said dilute sulfuric acid is carried out for from 5 to 15 minutes and leaching with said oxidizing agent is carried out for 5 to 8 minutes.

9. Method for leaching the iron from finely divided ilmenite ores according to claim 1 wherein the dilute sulfuric acid is waste sulfuric acid having an acid strength within the range from 3 to 24% $H_2SO_4$ and said waste sulfuric acid being used in an amount corresponding to an acid to total iron ratio in the range from 1:1 to about 3:1.

10. Method for leaching the iron from finely divided ilmenite ores to produce a titanium dioxide concentrate according to claim 1 wherein the finely divided ore is roasted in an oxidizing atmosphere prior to reducing the iron values to metallic iron.

11. Method for leaching the iron from finely divided ilmenite ores to produce a titanium dioxide concentrate comprising the steps of: upgrading the finely divided ore by removing gangue materials, heating the gangue-free ore under reducing conditions to reduce the iron values in said ore to metallic iron, leaching the metallized ore with waste sulfuric acid at a concentration in the range of from 5 to 15% $H_2SO_4$, at an acid pH, and at a temperature from 25°–100° C. for a period of time from 5–15 minutes to dissolve a major portion of the metallized iron from said ore, said waste sulfuric acid being added in an amount corresponding to an acid to total iron ratio of about 3:1, and thereafter leaching the acid leached ore with an oxidizing leach comprising an aqueous solution of a water-soluble ferric salt, said salt being added to said acid leach solution in an amount corresponding to a ferric salt to total iron ratio of from about 0.25:1 to 1:1, and at a temperature of from 25° to 100° C. for from 5 to 8 minutes to dissolve the remaining metallized iron from said ore, recovering the leached ore by filtration, and then water-washing the leached ore.

* * * * *